United States Patent [19]
Meader

[11] Patent Number: 6,079,982
[45] Date of Patent: Jun. 27, 2000

[54] INTERACTIVE SIMULATOR RIDE

[76] Inventor: Gregory M Meader, 708 Emerald Way, Placentia, Calif. 92870

[21] Appl. No.: 09/001,446

[22] Filed: Dec. 31, 1997

[51] Int. Cl.$^7$ .................................................... G09B 9/02
[52] U.S. Cl. ............................... 434/29; 434/62; 434/30; 472/59; 472/60
[58] Field of Search .................... 434/29, 61, 62, 434/66, 67, 69, 30; 446/447, 433; 104/83, 84, 85, 53; 472/32, 130, 831, 59, 43, 64, 60; D21/830, 814; 414/357

[56] References Cited

U.S. PATENT DOCUMENTS

| | | | |
|---|---|---|---|
| 1,485,839 | 3/1924 | Dye | 172/344 |
| 4,337,045 | 6/1982 | Jones et al. | 434/29 |
| 4,986,187 | 1/1991 | Booth et al. | 104/84 |
| 5,209,662 | 5/1993 | Fujita et al. | 434/61 |
| 5,222,893 | 6/1993 | Hardesty | 434/29 |
| 5,277,584 | 1/1994 | DeGroat et al. | 434/29 |
| 5,336,132 | 8/1994 | Murakami | 472/59 |
| 5,415,550 | 5/1995 | Aoki | 434/61 |
| 5,473,990 | 12/1995 | Anderson et al. | 104/85 |
| 5,547,382 | 8/1996 | Yamasaki et al. | 434/61 |
| 5,623,878 | 4/1997 | Baxter et al. | 104/85 |
| 5,660,547 | 8/1997 | Copperman | 434/29 |
| 5,669,821 | 9/1997 | Prather et al. | 472/59 |
| 5,860,807 | 1/1999 | McFarland et al. | 434/33 |
| 5,865,624 | 2/1999 | Hayashigawa | 434/66 |

FOREIGN PATENT DOCUMENTS 4102176  1/1990  Germany.

OTHER PUBLICATIONS

A brochure from Virtual Coasters Company, 11407 Clover Avenue, Los Angeles, California 90066, 7 pages, copyright date 1997.

*Primary Examiner*—Valencia Martin-Wallace
*Assistant Examiner*—David Aaron Fleming

[57] ABSTRACT

A new interactive simulator ride for providing an entertaining interactive visual, audio, and motion simulation. The inventive device includes a guidance track comprised of a plurality of laterally spaced guidance rails, a simulator vehicle housing having an interior and having lateral side walls having a plurality of support wheels mounted thereon for supporting the simulator vehicle housing on the spaced guidance rails. A seat for seating by a person is provided within the interior of the simulator vehicle housing. A viewing screen is provided within the simulator vehicle housing interior for providing a computer generated visual image for viewing by a person located in the simulator housing. The invention also includes a projection means for projecting a computer generated visual image on the viewing screen, a means for providing computer generated visual images to the projection means, and a user input device. The input device provides input data from a person within the simulator vehicle housing to the computer generated visual images providing means. The input data represents a reaction to the visual images which the computer generated visual images providing means uses to modify the displayed visual images accordingly. Preferably, the projection means, the computer generated visual images providing means are provided within a multimedia computer included within the simulator vehicle housing.

10 Claims, 3 Drawing Sheets

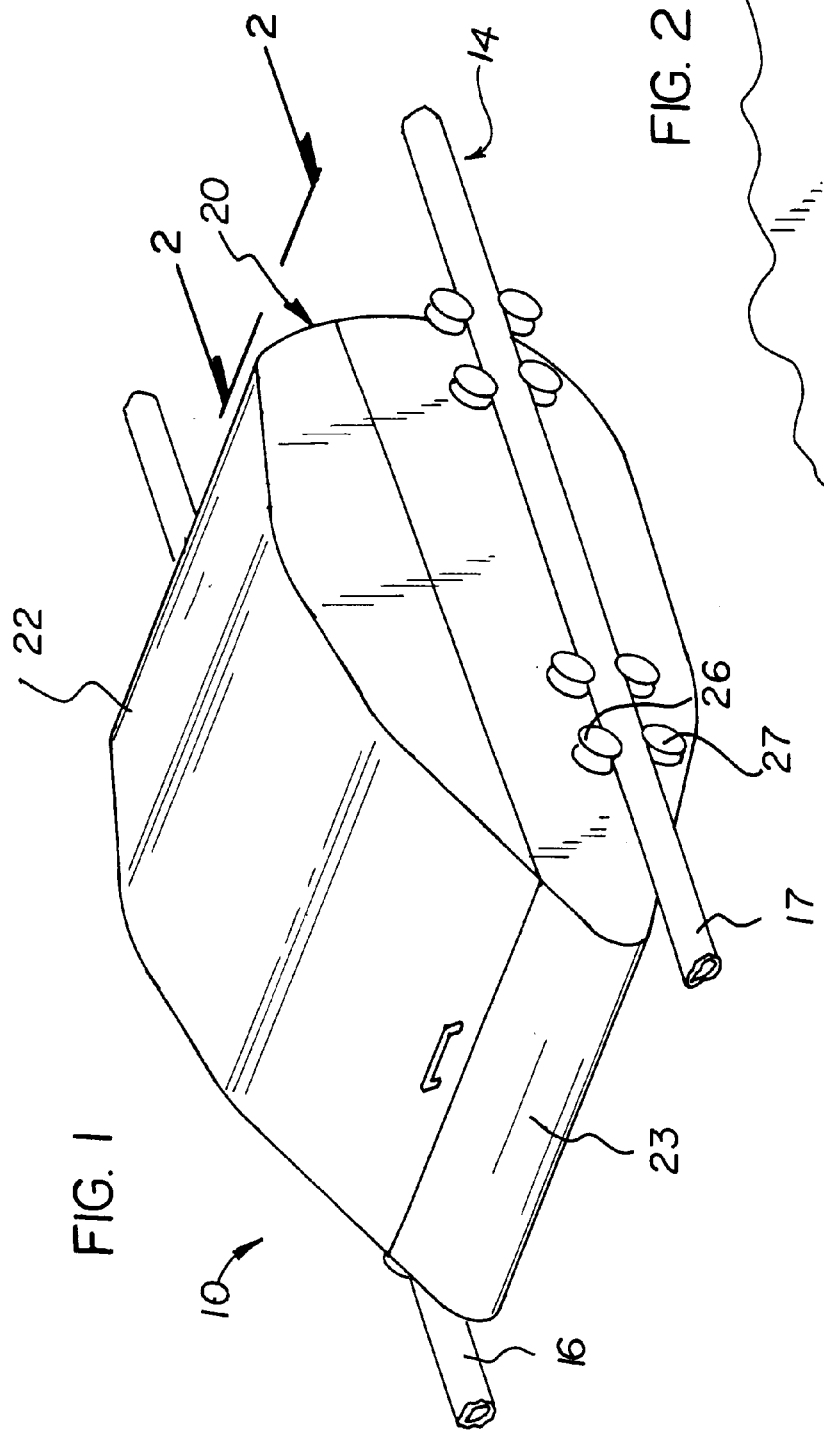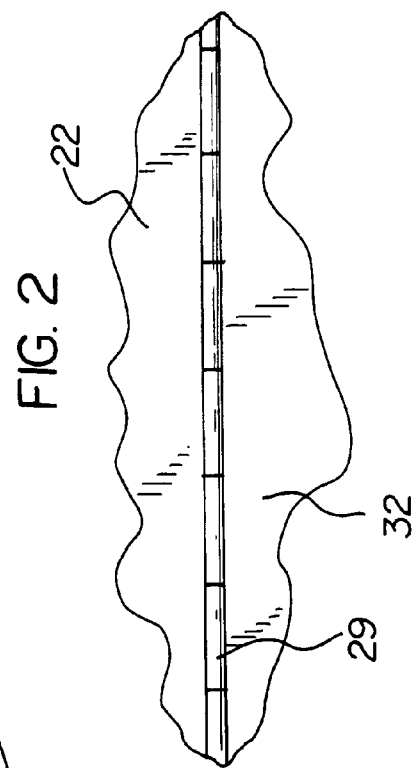

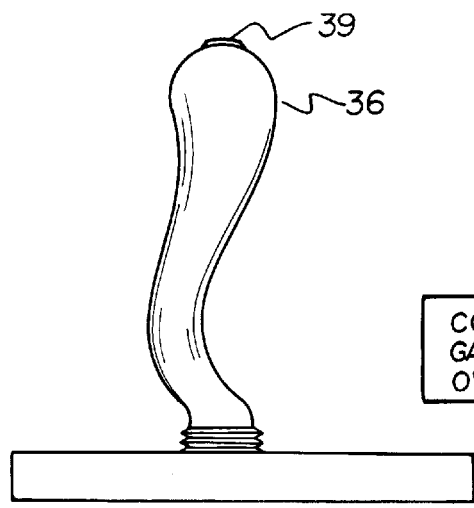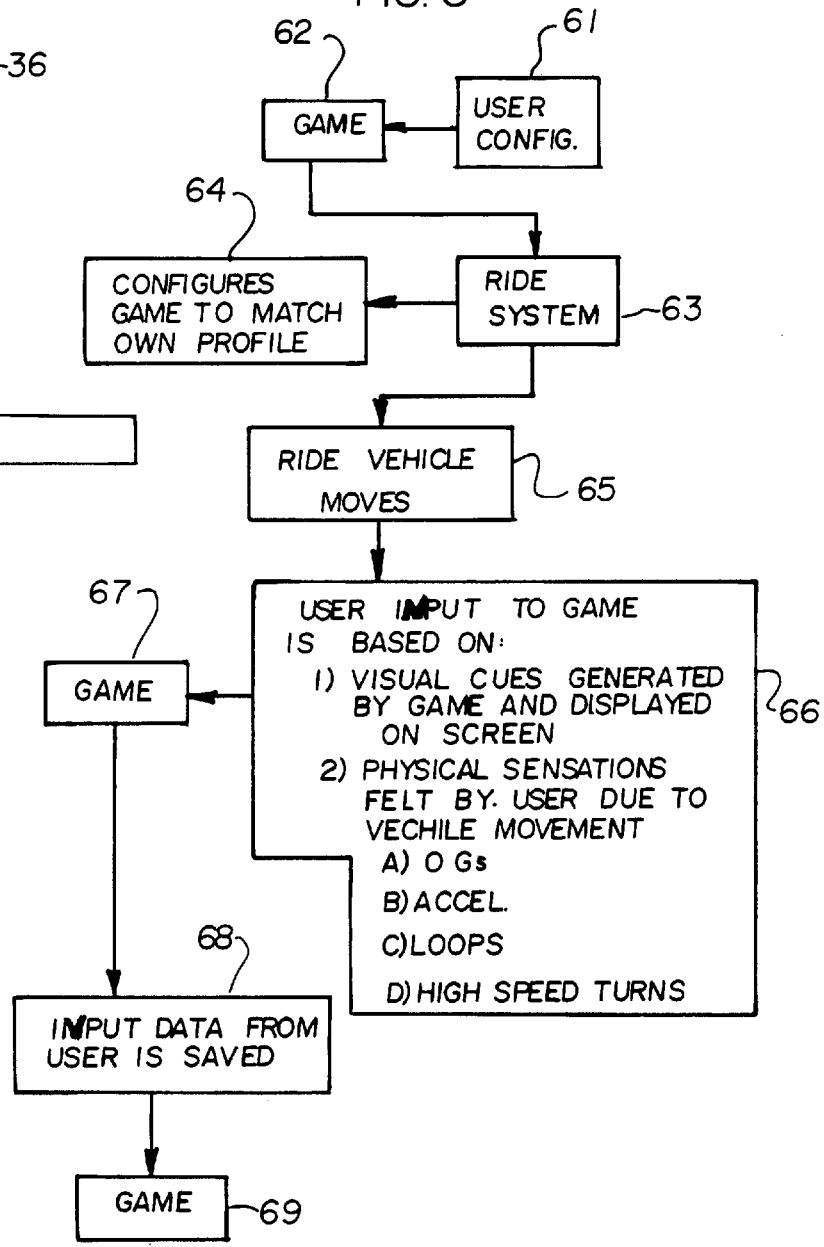

INTERACTIVE SIMULATOR RIDE

BACKGROUND OF THE INVENTION

1. Field of the Invention

The present invention relates to simulators and more particularly pertains to a new interactive simulator ride for providing an entertaining interactive visual, audio, and motion simulation.

2. Description of the Prior Art

The use of simulators is known in the prior art. More specifically, simulators heretofore devised and utilized are known to consist basically of familiar, expected and obvious structural configurations, notwithstanding the myriad of designs encompassed by the crowded prior art which have been developed for the fulfillment of countless objectives and requirements.

Known prior art simulators include U.S. Pat. No. 5,299,810; U.S. Pat. No. 4,315,241; U.S. Pat. Des. No. 345,580; U.S. Pat. No. 5,388,991; U.S. Pat. No. 4,343,037; U.S. Pat. No. 4,281,994; and U.S. Pat. No. 5,320,351.

While these devices fulfill their respective, particular objectives and requirements, the aforementioned patents do not disclose a new interactive simulator ride. The inventive device includes a guidance track comprised of a plurality of laterally spaced guidance rails, a simulator vehicle housing having an interior and having lateral side walls having a plurality of support wheels mounted thereon for supporting the simulator vehicle housing on the spaced guidance rails. A seat for seating by a person is provided within the interior of the simulator vehicle housing. A viewing screen is provided within the simulator vehicle housing interior for providing a computer generated visual image for viewing by a person located in the simulator housing. The invention also includes a projection means for projecting a computer generated visual image on the viewing screen, a means for providing computer generated visual images to the projection means, and a user input device. The input device provides input data from a person within the simulator vehicle housing to the computer generated visual images providing means. The input data represents a reaction to the visual images which the computer generated visual images providing means uses to modify the displayed visual images accordingly. Preferably, the projection means, the computer generated visual images providing means are provided within a multimedia computer included within the simulator vehicle housing.

In these respects, the Interactive simulator ride according to the present invention substantially departs from the conventional concepts and designs of the prior art, and in so doing provides an apparatus primarily developed for the purpose of providing an entertaining interactive visual, audio, and motion simulation.

SUMMARY OF THE INVENTION

In view of the foregoing disadvantages inherent in the known types of simulators now present in the prior art, the present invention provides a new Interactive simulator ride construction wherein the same can be utilized for providing an entertaining interactive visual, audio, and motion simulation.

The general purpose of the present invention, which will be described subsequently in greater detail, is to provide a new Interactive simulator ride apparatus and method which has many of the advantages of the simulators mentioned heretofore and many novel features that result in a new Interactive simulator ride which is not anticipated, rendered obvious, suggested, or even implied by any of the prior art simulators, either alone or in any combination thereof.

To attain this, the present invention generally comprises a guidance track comprised of a plurality of laterally spaced guidance rails, a simulator vehicle housing having an interior and having lateral side walls having a plurality of support wheels mounted thereon for supporting the simulator vehicle housing on the spaced guidance rails. A seat for seating by a person is provided within the interior of the simulator vehicle housing. A viewing screen is provided within the simulator vehicle housing interior for providing a computer generated visual image for viewing by a person located in the simulator housing. The invention also includes a projection means for projecting a computer generated visual image on the viewing screen, a means for providing computer generated visual images to the projection means, and a user input device. The input device provides input data from a person within the simulator vehicle housing to the computer generated visual images providing means. The input data represents a reaction to the visual images which the computer generated visual images providing means uses to modify the displayed visual images accordingly. Preferably, the projection means, the computer generated visual images providing means are provided within a multimedia computer included within the simulator vehicle housing.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Interactive simulator ride apparatus and method which has many of the advantages of the simulators mentioned heretofore and many novel features that result in a new Interactive simulator ride which is not anticipated, rendered obvious, suggested, or even implied by any of the prior art simulators, either alone or in any combination thereof.

It is another object of the present invention to provide a new Interactive simulator ride which may be easily and efficiently manufactured and marketed.

It is a further object of the present invention to provide a new Interactive simulator ride which is of a durable and reliable construction.

An even further object of the present invention is to provide a new Interactive simulator ride which is susceptible of a low cost of manufacture with regard to both materials and labor, and which accordingly is then susceptible of low prices of sale to the consuming public, thereby making such Interactive simulator ride economically available to the buying public.

Still yet another object of the present invention is to provide a new interactive simulator ride which provides in the apparatuses and methods of the prior art some of the advantages thereof, while simultaneously overcoming some of the disadvantages normally associated therewith.

Still another object of the present invention is to provide a new interactive simulator ride for providing an entertaining interactive visual, audio, and motion simulation, combining the enjoyment of a video game with the thrills of an amusement ride.

Yet another object of the present invention is to provide a new interactive simulator ride which includes a guidance track comprised of a plurality of laterally spaced guidance rails, a simulator vehicle housing having an interior and having lateral side walls having a plurality of support wheels mounted thereon for supporting the simulator vehicle housing on the spaced guidance rails. A seat for seating by a person is provided within the interior of the simulator vehicle housing. A viewing screen is provided within the simulator vehicle housing interior for providing a computer generated visual image for viewing by a person located in the simulator housing. The invention also includes a projection means for projecting a computer generated visual image on the viewing screen, a means for providing computer generated visual images to the projection means, and a user input device. The input device provides input data from a person within the simulator vehicle housing to the computer generated visual images providing means. The input data represents a reaction to the visual images which the computer generated visual images providing means uses to modify the displayed visual images accordingly. Preferably, the projection means, the computer generated visual images providing means are provided within a multimedia computer included within the simulator vehicle housing.

Still yet another object of the present invention is to provide a new interactive simulator ride that allows a rider of a roller coaster ride to perform tasks and activities from a multimedia source contained within the ride.

Even still another object of the present invention is to provide a new interactive simulator ride that allows a user to experience different simulated environments while riding a single amusement ride.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic perspective view of the exterior of the simulator vehicle housing of a new interactive simulator ride according to the present invention.

FIG. 2 is a schematic partial side view of the present invention taken from the perspective of line 2—2 of FIG. 1.

FIG. 5 is a schematic side view of an user input device contained within the interior of the simulator vehicle housing of the present invention.

FIG. 6 is a schematic block flow chart diagram of the showing the operation of the interactive simulator ride of the present invention.

DESCRIPTION OF THE PREFERRED EMBODIMENT

Figure 3:
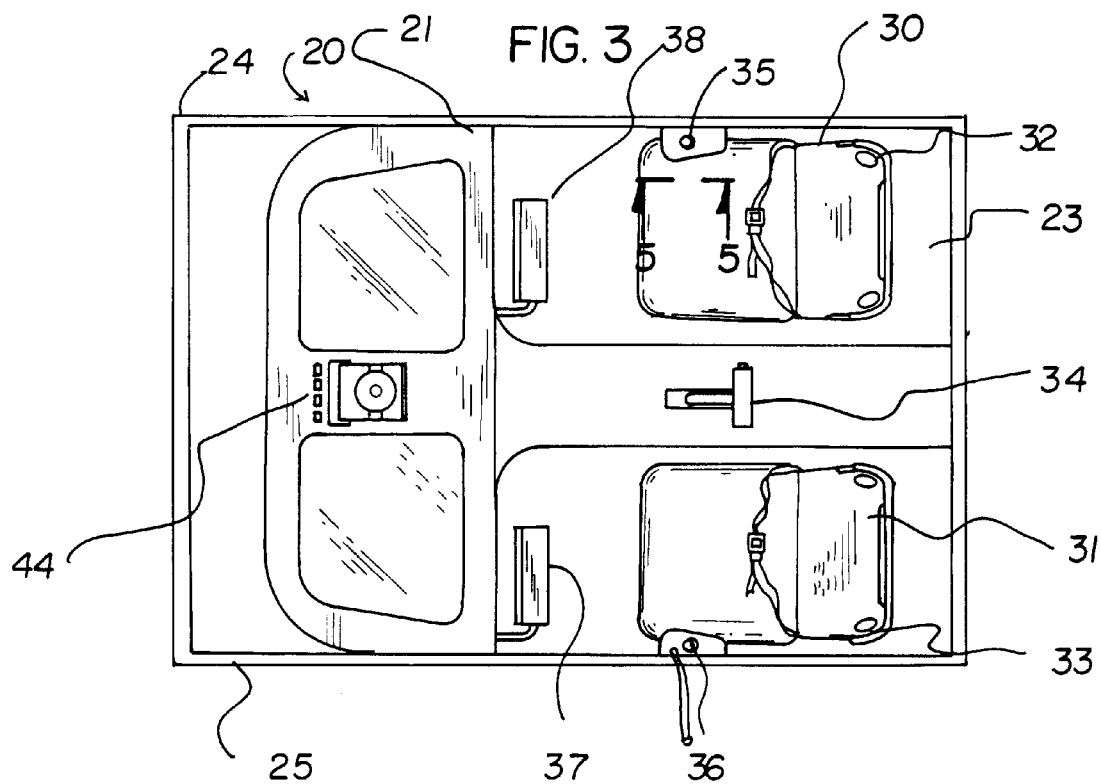
FIG. 3 is a schematic top plan view of the interior of the simulator vehicle housing of the present invention.
Figure 4:
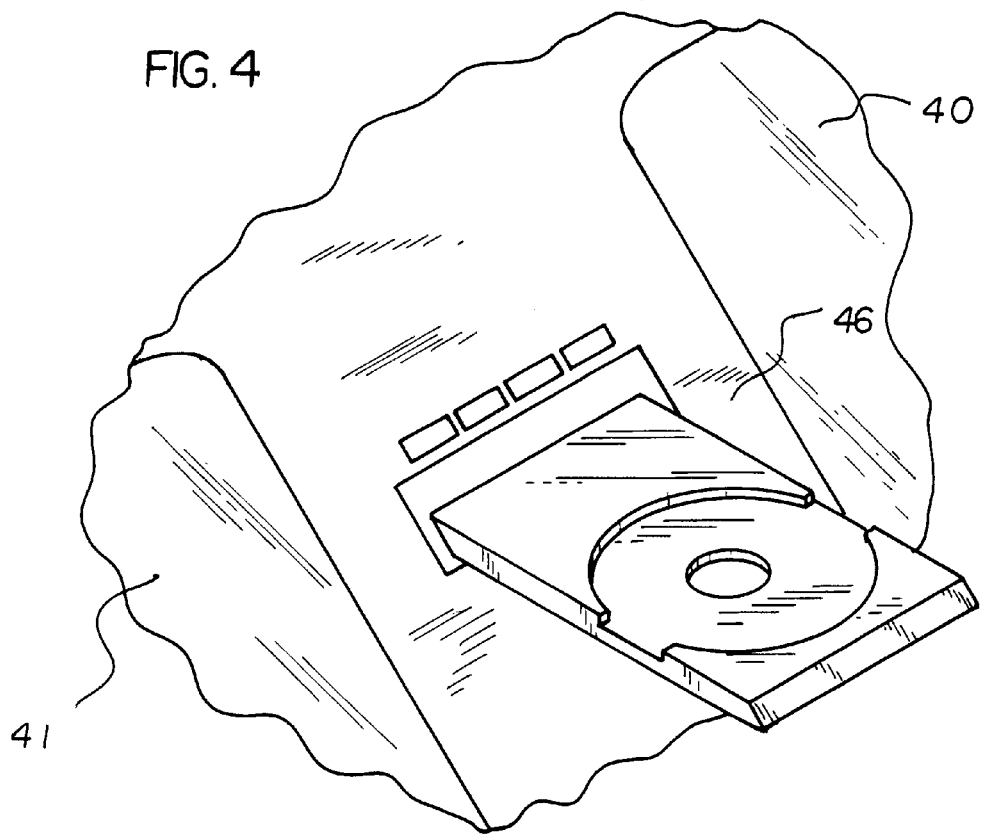
FIG. 4 is a schematic partial perspective view of the means for reading multimedia information of the present invention.

With reference now to the drawings, and in particular to FIGS. 1 through 6 thereof, a new interactive simulator ride embodying the principles and concepts of the present invention and generally designated by the reference numeral 10 will be described.

As best illustrated in FIGS. 1 through 6, the interactive simulator ride 10 basically comprises simulator vehicle housing 10 that is moved along a guidance track 14. The guidance track 14 has a plurality of laterally spaced guidance rails 16,17. The guidance track 14 is similar to traditional roller coaster ride tracks and may include hills, straight-aways, loops and curves or turns.

The simulator vehicle housing 20 has an upper portion 22 and a lower portion 23 which define its interior 21. The two portions are attached by a hinge means 23. The simulator vehicle housing 20 also has a pair lateral side walls 24,25 each having a plurality of support wheels 26,27 mounted on them. The support wheels 26,27 support the simulator vehicle housing 20 on the spaced guidance rails 16,17 and help the simulator vehicle housing 20 move along the guidance track 14.

Within its interior 21, there is at least one seat 30,31 for seating by a person. A viewing screen 40,41 is also provided within the interior 21 to allow viewing of a computer generated visual image by a person located in the simulator vehicle housing 20. The simulator vehicle housing 20 also includes a projection means (not shown) for projecting a computer generated visual image on the viewing screen 40,41.

The interactive simulator ride 10 also includes a means (not shown) for providing computer generated visual images to the projection means. The invention is designed to display on the viewing screen 40,41 various visual images of computer generated spaces or environments. Examples of these environments may include outer space, a highway, a city street, a sky environment, an undersea environment, or any environment one can imagine. The means for providing computer generated visual images also provides for including visual images of movement through the simulated space or environment that including simulated movement corresponding to movement of the simulator vehicle housing 20 along the guidance track 14.

Preferably, the means for providing computer generated visual images also provides visual images of additional objects (not shown) that are depicted within the simulated space or environment. Preferably, these additional objects should be able to be displayed so that are seen from the perspective of the simulator vehicle housing 20 moving along the guidance track 14 while still being able to move independently in relation to other objects displayed in the simulated environment. For example, the additional objects may include aliens, insects, other people, or prizes such as stars, coins and bells that are able to move independently from each other within the simulated space or environment.

To make the interactive simulator ride 10 interactive for a user, the invention includes a plurality of user input devices 34,35,36,37,38,39. The user input devices 34,35,36, 37,38,39 allow a user to provide or transmit input data to the computer generated visual images providing means. The user input devices 34,35,36,37,38,39 convert physical actions by the user in reaction to the generated visual images into input data for supplying to the computer generated visual images providing means. The computer generated visual images providing means uses the input data to modify the additional objects visual images accordingly. For example, if the simulation provides for the user to shoot aliens appearing in the simulated environment, the user may use a user input device such as a joystick 36 with an action button 39 to aim a movable cursor provided in the simulated visual image by moving the joystick 36 to aim the cursor and pressing on the action button 39 to fire a simulated projectile at the alien. The actions performed on the joystick 36 and action button 39 would then be converted into input data readable to the computer generated visual images providing means. The computer generated visual images providing means would then modify the alien image and the appropriate surrounding space images to reflect whether the simulated projectile missed or destroyed the alien.

The interactive simulator ride 10 also includes a means for providing sounds corresponding to the computer generated simulated visual images and the user input data. Preferably, The means for providing sounds provides sounds corresponding to movement along the guidance track and sounds corresponding to the additional objects visual images and the modification of such visual images. Preferably, the means for providing sounds includes speakers 32,33 on each seat 30,31 to provide a user with an immediate and realistic sound experience.

The interactive simulator ride 10 further includes a means for recording the sounds (not shown) corresponding to the computer generated simulated visual images and the user input data. Preferably, the sound recording means is removable from the interactive simulator ride to permit a person to posses a sound recording of a particular simulation ride. This may be a recording device, such as a recordable CD-ROM or a computer game cartridge, that may be accessed by the sound generating means and the sound recording means through a recording device access means 46.

Also included in the interactive simulator ride 10 is a means for recording the visual images (not shown) including visual images of movement through a simulated space. This visual images recording means allows the recording of the visual images of additional objects in the simulated space and the user input data for modifying the visual images generated. This allows a user to participate in subsequent simulation that continues from a previous ride simulation. This, for example, allows a user to advance through varying degrees of difficulty tasks or situations presented in the computer generated simulated space or environment. Like the sound recording means, the visual image recording means is also removable from the interactive simulator ride to permit a person to posses a visual recording of a particular simulation ride. This may be done as well by a recordable CD-ROM or the visual image recording means is removable from the interactive simulator ride for permitting a person to modify a future simulation ride on an additional interactive simulator ride at a different location such as another theme park or on any home computer.

Preferably, the means for providing computer generated visual images, the means for recording the sounds, the means for providing sounds, the projection means for projecting a computer generated visual image on the viewing screen, and the means for recording the visual images are all provided for in a single device such as a multimedia computer. Preferably, this multimedia computer is located within the simulator vehicle housing 20.

In use, FIG. 6 shows a method for modifying the visual image displayed on the viewing screen 40,41 within the interior 21 of the simulator vehicle housing 20 moving along the guidance track 14. With reference to FIG. 6, a user's preferences for the simulation at block 61 are entered into the simulation at block 62. Preferably, the user's prefences 61 for the similution 62 are entered into the simulation 62 via a home computer or game system. The simulation at block 62 includes the means included in the interactive simulator ride 10 that provides the simulated environment, the additional visual objects and corresponding sounds. In other words, block 62 provides the specific scenario to be experienced in the interactive simulator ride 10 such as a ride through outer space to destroy various passing aliens.

Once the user's preferences have been included in the scenario, the scenario's visual images and sounds are applied to the rest of the interactive simulator ride 10 system as shown by block 63. The interactive simulator ride 10 then configures all requirements of the scenario to match its profile at block 64. This includes matching the scenario with the path of the guidance track 14, the particular functions of the various user input devices 34,35,36,37,38,39 within the interior 21. After the scenario is loaded into all the appropriate means in the interactive simulator ride 10, the simulator vehicle housing 20 is then moved along the guidance track 14 at block 65.

With reference to block 66, the computer generated visual images provided by the means for providing computer generated visual images, the additional computer generated visual images provided from the means for providing computer generate visual images, the sounds corresponding to the computer generated simulated visual images provided by the means for providing sounds, and the physical effects of the movement along the guidance track 14 are presented to the user's senses.

From these sounds, images, and physical feelings, the user uses the various user input devices 34,35,36,37,38,39 to enter input data to the means for providing computer generated visual images from the user input device as shown by reference to block 67. Accordingly, the visual images are then modified to correspond to the provided input data by the computer generated visual images providing means while the means for providing sounds provides sounds corresponding to modifications to the additional objects visual images by the input data.

The interactive simulator ride 10 then records the sounds to the sound recording means and also records the various visual images that have been displayed to the visual image recording means as shown by block 68. As mentioned earlier, the sound recording means and the visual image recording means are both preferable removable and used in future rides on the interactive simulator ride or on the user's own home personal computer as shown by block 69.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An interactive simulator ride comprising:
    a guidance track having pair of laterally spaced guidance rails, said guidance track being formed into a substantially continuous loop having peaks and valleys along a length of said guidance track;
    a simulator vehicle housing having an interior and having lateral side walls having a plurality of support wheels mounted thereon for supporting said simulator vehicle housing on said spaced guidance rails;
    a seat for seating by a person being provided within said interior of said simulator vehicle housing;
    a viewing screen being provided within said simulator vehicle housing interior for providing a computer generated visual image for viewing by a person located in said simulator housing as said simulator vehicle travels along said continuous loop;
    a projection means for projecting a computer generated visual image on said viewing screen corresponding to movement of said simulator vehicle as said simulator vehicle travels along said continuous loop;
    a means for providing selectable computer generated visual images to said projection means, said visual images including visual images of movement through a simulated space, said movement along a simulated space corresponding to movement of said simulator vehicle as said simulator vehicle travels along said continuous loop, and including visual images of additional objects in said simulated space; and
    a user input device for providing input data from a person within said simulator vehicle housing to said computer generated visual images providing means, said input data being for representing a reaction to said visual images of additional objects in said simulated space, said computer generated visual images providing means modifying said visual images of additional objects in said simulated space according to said input data whereby selection of said visual images displayed is responsive to said input data from said user input device.

2. The interactive simulator ride of claim 1, further comprising a means for providing a first set of sounds associated with said computer generated simulated visual images and said user input data including providing a second set of sounds associated with movement as said simulator vehicle travels along said continuous loop and a third set of sounds associated with said visual images of additional objects in said simulated space.

3. The interactive simulator ride of claim 2, further comprising a means for recording said first set of sounds corresponding to said computer generated simulated visual images.

4. The interactive simulator ride of claim 3, wherein said sound recording means is removable from said interactive simulator ride to permit a person to posses a sound recording of a particular simulation ride.

5. The interactive simulator ride of claim 1, further comprising a means for recording said visual images including visual images of movement through a simulated space, visual images of additional objects in said simulated space and said user input data for modifying the visual images generated for subsequent simulation rides by a person within said simulator vehicle housing.

6. The interactive simulator ride of claim 5, wherein said visual image recording means is removable from said interactive simulator ride to permit a person to posses a visual recording of a particular simulation ride.

7. The interactive simulator ride of claim 5, wherein said visual image recording means is removable from said interactive simulator ride for permitting a person to modify a future simulation ride on an additional interactive simulator ride.

8. A method for modifying the visual image displayed within the interior of a simulator vehicle housing moving along a guidance track of a interactive simulator ride having a user within said simulator vehicle housing, which comprises the steps:
    providing an interactive simulator ride which includes:
        a guidance track having a pair of laterally spaced guidance rails forming a substantially continuous loop having peaks and valleys along a length of said guidance track;
        a simulator vehicle housing having an interior and having lateral side walls having a plurality of support wheels mounted thereon for supporting said simulator vehicle housing on said spaced guidance rails;
        a seat for seating by a person being provided within said interior of said simulator vehicle housing;
        a viewing screen provided within said simulator vehicle housing interior for providing a computer generated visual image for viewing by a person located in said simulator housing;
        a projection means for projecting a computer generated visual image on said viewing screen corresponding to movement of said simulator vehicle along said guidance track;
        a means for providing computer generated visual images to said projection means, said visual images including visual images of movement through a simulated space, said movement along a simulated space corresponding to movement of said simulator vehicle along said guidance track, and including visual images of additional objects in said simulated space;

a user input device for providing input data from a person within said simulator vehicle housing to said computer generated visual images providing means, said input data for representing a reaction to said additional objects visual images, said computer generated visual images providing means modifying said additional objects visual images according to said input data whereby selection of said video images displayed is responsive to said user input device; and a means for providing sounds corresponding to said computer generated simulated visual images and said user input data including providing sounds for corresponding to movement along said guidance track, sounds corresponding to said additional objects visual images, and sounds corresponding to modifications to said additional objects visual images by said input data;

moving said simulator vehicle housing along said guidance track;

providing computer generated visual images from said means for providing computer generate visual images, said provided visual images including visual images of movement through a simulated space corresponding to movement of said simulator vehicle along said guidance track, and including visual images of additional objects in said simulated space;

providing additional computer generated visual images from said means for providing computer generate visual images, said provided additional visual images including visual images of additional objects in said simulated space;

providing sounds corresponding to said computer generated simulated visual images by said means for providing sounds;

entering input data to said means for providing computer generated visual images from said user input device;

modifying said visual images to correspond to said provided input data by said computer generated visual images providing means; and providing sounds by said means for providing sounds, said sounds corresponding to modifications to said additional objects visual images by said input data.

9. A method for modifying the visual image displayed within the interior of a simulator vehicle housing moving along a guidance track of a interactive simulator ride having a user within said simulator vehicle housing, which comprises the steps:

providing an interactive simulator ride which includes:

a guidance track having a plurality of laterally spaced guidance rails, a simulator vehicle housing having an interior and having lateral side walls having a plurality of support wheels mounted thereon for supporting said simulator vehicle housing on said spaced guidance rails, a seat for seating by a person being provided within said interior of said simulator vehicle housing, a viewing screen provided within said simulator vehicle housing interior for providing a computer generated visual image for viewing by a person located in said simulator housing, a projection means for projecting a computer generated visual image on said viewing screen corresponding to movement of said simulator vehicle along said guidance track, a means for providing computer generated visual images to said projection means, said visual images including visual images of movement through a simulated space, said movement along a simulated space corresponding to movement of said simulator vehicle along said guidance track, and including visual images of additional objects in said simulated space, a user input device for providing input data from a person within said simulator vehicle housing to said computer generated visual images providing means, said input data for representing a reaction to said additional objects visual images, said computer generated visual images providing means modifying said additional objects visual images according to said input data whereby selection of said video images displayed is responsive to said user input device, and a means for providing sounds corresponding to said computer generated simulated visual images and said user input data including providing sounds for corresponding to movement along said guidance track, sounds corresponding to said additional objects visual images, and sounds corresponding to modifications to said additional objects visual images by said input data;

moving said simulator vehicle housing along said guidance track;

providing computer generated visual images from said means for providing computer generate visual images, said provided visual images including visual images of movement through a simulated space corresponding to movement of said simulator vehicle along said guidance track, and including visual images of additional objects in said simulated space;

providing additional computer generated visual images from said means for providing computer generate visual images, said provided additional visual images including visual images of additional objects in said simulated space;

providing sounds corresponding to said computer generated simulated visual images by said means for providing sounds;

entering input data to said means for providing computer generated visual images from said user input device;

modifying said visual images to correspond to said provided input data by said computer generated visual images providing means;

providing sounds by said means for providing sounds, said sounds corresponding to modifications to said additional objects visual images by said input data; and providing a means for recording said sounds corresponding to said computer generated simulated visual images and said user input data including providing sounds for corresponding to movement along said guidance track and sounds corresponding to said additional objects visual images.

10. The method of claim 9, wherein said sound recording means is removable from said interactive simulator ride to permit a person to posses a sound recording of a particular simulation ride.

* * * * *